United States Patent [19]

Inoue et al.

[11] 4,072,217
[45] Feb. 7, 1978

[54] DISCS BRAKE OF FLOATING CALIPER TYPE

[75] Inventors: Takehisa Inoue, Iwatsuki; Yutaka Ogawa, Tokyo; Hiroaki Sugita, Gyoda; Namio Watanabe, Kuki, all of Japan

[73] Assignee: Akebono Brake Industry Co., Ltd., Tokyo, Japan

[21] Appl. No.: 737,346

[22] Filed: Nov. 1, 1976

[30] Foreign Application Priority Data

Oct. 31, 1975 Japan ............................. 50-148669[U]
Oct. 31, 1975 Japan ............................. 50-148670[U]

[51] Int. Cl.² ............................................. F16D 65/02
[52] U.S. Cl. ................................... 188/73.6; 188/73.3
[58] Field of Search ................... 188/72.4, 73.3, 73.4, 188/73.6

[56] References Cited

U.S. PATENT DOCUMENTS

| 3,081,843 | 3/1963 | Dotto et al. ......................... 188/73.6 |
| 3,334,708 | 8/1967 | Swift ..................................... 188/72.4 |
| 3,930,564 | 1/1976 | Kobayashi et al. ................. 188/73.6 |
| 3,952,840 | 4/1976 | Yamazaki et al. .................. 188/73.4 |
| 3,964,583 | 6/1976 | Montalvo ............................ 188/73.6 |

FOREIGN PATENT DOCUMENTS

| 2,510,037 | 9/1975 | Germany ............................. 188/73.3 |
| 1,929,822 | 12/1970 | Germany ............................. 188/73.3 |
| 1,375,697 | 11/1974 | United Kingdom ................ 188/73.4 |

*Primary Examiner*—Trygve M. Blix
*Assistant Examiner*—Edward R. Kazenske
*Attorney, Agent, or Firm*—Toren, McGeady and Stanger

[57] ABSTRACT

A disc brake of the floating caliper type has a pair of laterally spaced guide pins each slidably engageable at one end within a boot provided in a receptor hole in a caliper and rigidly secured at the other end to a support plate for the caliper. For facilitating the replacement of friction pads, displacement between the support plate and one of the guide pins is provided so that in replacing the friction pads, it is only necessary to loosen one of the guide pins and then to rotate the caliper about the other guide pin.

8 Claims, 8 Drawing Figures

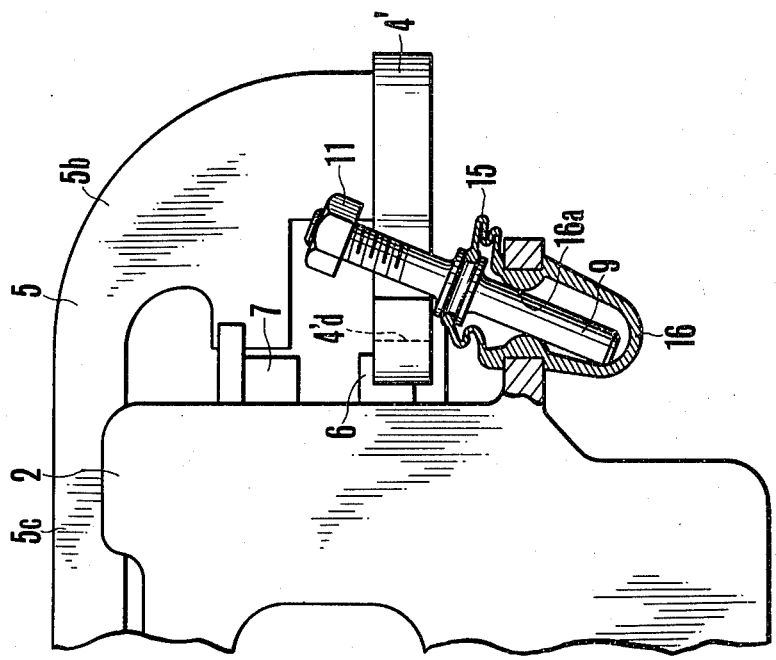
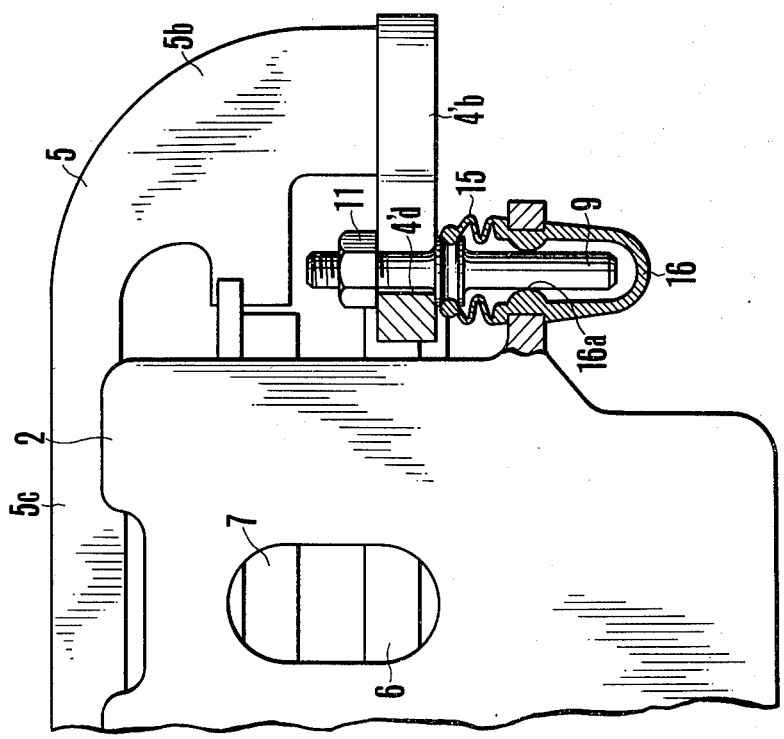
FIG.3a
FIG.3b

DISCS BRAKE OF FLOATING CALIPER TYPE

This invention relates to disc brakes of the floating caliper type, and more particularly to an improvement of the caliper support structure.

Conventional disc brakes of the floating caliper type are so constructed that when the friction pad is exchanged by new one, the caliper and the support member therefor are separated from each other in such a manner that after one of the paired fasteners which are adapted to function as guide pins for braking action is taken out of them, the caliper is turned about the other fastener to a point at which the old friction pad is removable from the caliper. In this case, however, it has often happened that, as the removed guide pin may be exposed to environmental influences such as of muddy water, after the caliper and the support member are registered with each other by the once removed fastener or guide pin, the guiding action does not operate well because of migration of dust into the interspace between the guide pin and a receptor therefor.

An object of the present invention is to provide a disc brake of the floating caliper type having an improved caliper support structure for facilitating the exchange of a friction pad without suffering from damage which might be otherwise encountered when the once broken caliper guiding mechanism is re-established after the friction pad is exchanged.

According to the present invention, a disc brake of the floating caliper type is provided with a pair of guiding arrangements for achieving relative movement of a caliper to a support plate therefor, each of which guide arrangements comprises a guide pin rigidly secured at one end thereof to the support plate by means of a screw-thread and nut and a guide pin receptor formed in either side portion of the caliper. One of the holes of the support plate through which the screw-threads extend is slotted off from the support plate so that when the nut with the screw-thread extending through the slotted-off hole of the support plate is slightly loosened, the caliper can be turned about the other guide pin to a point at which the old friction pad can be replaced by the new one, while permitting the loosened guide pin to remain engaged with its receptor, although it is disengaged from the support plate.

FIGS. 3A and 3B are fragmentary side elevational views, partly in section, of a second embodiment of a disc brake according to the present invention.

Figure 1:
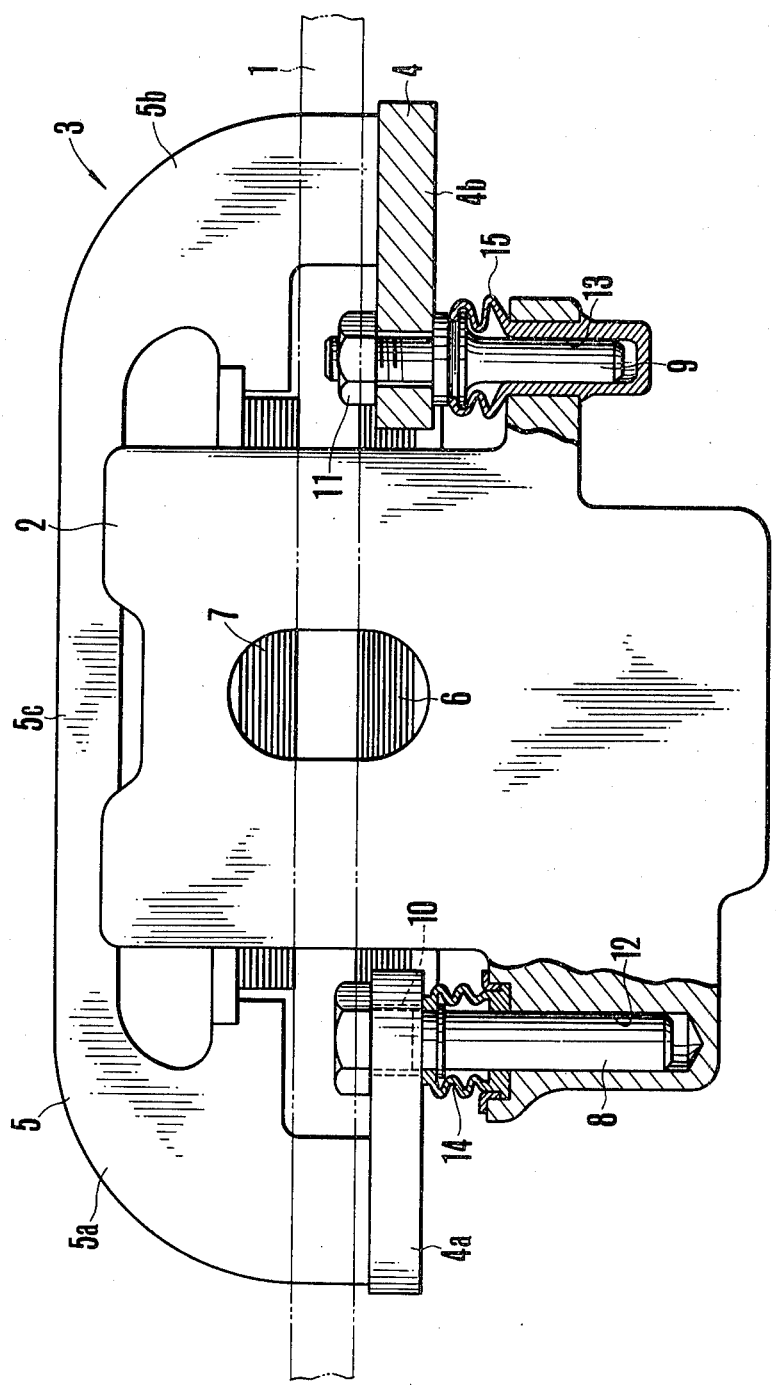
FIG. 1 is a side elevational view, partly in section, of one embodiment of a disc brake of the floating caliper type according to the present invention.
Figure 2:
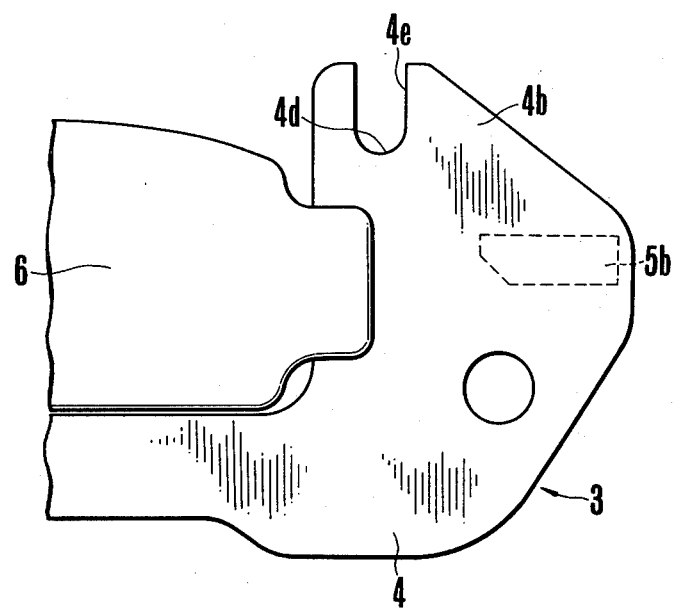
FIG. 2 is a fragmentary bottom view of the disc brake of FIG. 1 with the support plate having a laterally slotted-off hole.

Referring now to FIGS. 1 and 2, there is shown one embodiment of the disc brake according to the invention comprising an axially-located rotating member or rotor 1 having a wheel, not shown connected on the respective ends thereof, a caliper 2 having acting and reacting portions on either side of the rotor 1, a support member 3 of T-shape, as viewed from the side fixedly mounted on a vehicle body, not shown, and constructed from first and second plates 4 and 5 in such a manner that the first plate 4 having left and right arms 4a and 4b is rigidly attached to the second plate 5 in rectangularly abutting relation at the central portions of the first plate arms 4a and 4b on the edges of left and right arms 5a and 5b of the second plate 5, a pair of friction pads 6, 7 supported by the above first and second plates 4, 5 in the axial direction of the rotor and a guiding mechanism for guiding the caliper in the axial direction of the rotor 1 during the braking process.

The guiding mechanism comprises a pair of guide pins 8 and 9 rigidly secured at one end thereof to the first plate arms 4a and 4b by means of screw-thread and nut combinations 10 and 11 respectively and downwardly extending therefrom into respective receptors 12 and 13 with respective resilient air-tight shields 14 and 15. According to the present invention, the hole 4d of the first support plate 4 through which the bolted section of the second guide pin 9 extends is slotted off outwardly in the radial direction of the rotor 1 as indicated by 4e in FIG. 2, so that when the second screw-thread and nut 11 are slightly loosened, the caliper 2 can be turned about the first guide pin 8 to expose the friction pads 6 and 7, as the second screw-thread and nut combination 11 is moved away from the hole 4d through the slotted-off portion 4e toward the outside of the first support plate 4, whereby it is possible to exchange the friction pads by new ones without the necessity of the complete removal of the second guide pin 9 from the receptor 13, and therefore without causing entrance of foreign material such as muddy water into the sliding interspace between the second guide pin 9 and its receptor 13. Thus, the operation of exchanging the friction pads 6 and 7 is greatly facilitated.

Figure 4:
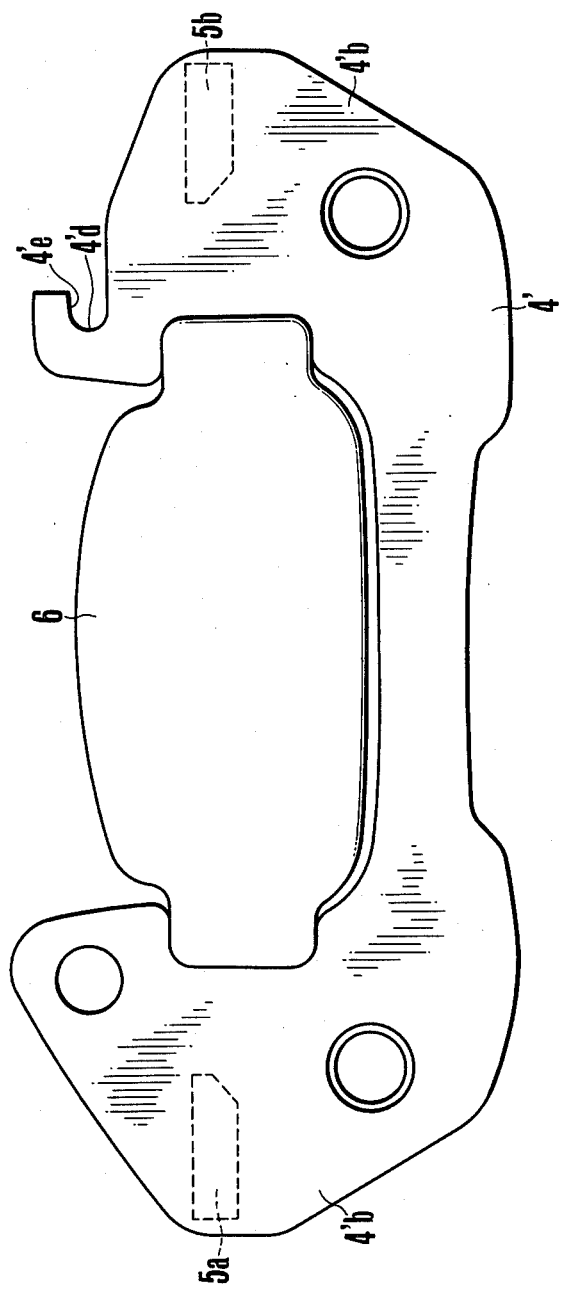
FIG. 4 is a bottom view of the disc brake of FIG. 3 with the support plate having a longitudinally slotted-off hole.

FIGS. 3A and 3B and FIG. 4 show another embodiment of the disc brake according to the present invention, wherein the second guide pin 9 is inserted in an over-bored receptor a sealing boat 16 with an annular projection 16a surrounding the guide pin 9 at a center thereof so that when the screw-thread and nut combination 11 is loosened, the guide pin 9 can be inclined in a direction as shown in FIG. 3B to move away from the path of rotative movement of the first support plate 4' relative to the caliper 2, as the hole 4'd is slotted off outwardly as shown in FIG. 4 in the axial direction of the rotor 1 not shown. An advantage of the second embodiment is that the angular adjustment of the caliper 2 relative to the support member 3 is automatically effected because the hole 4'd is slotted off outwardly as indicated by 4'e.

Figure 5:
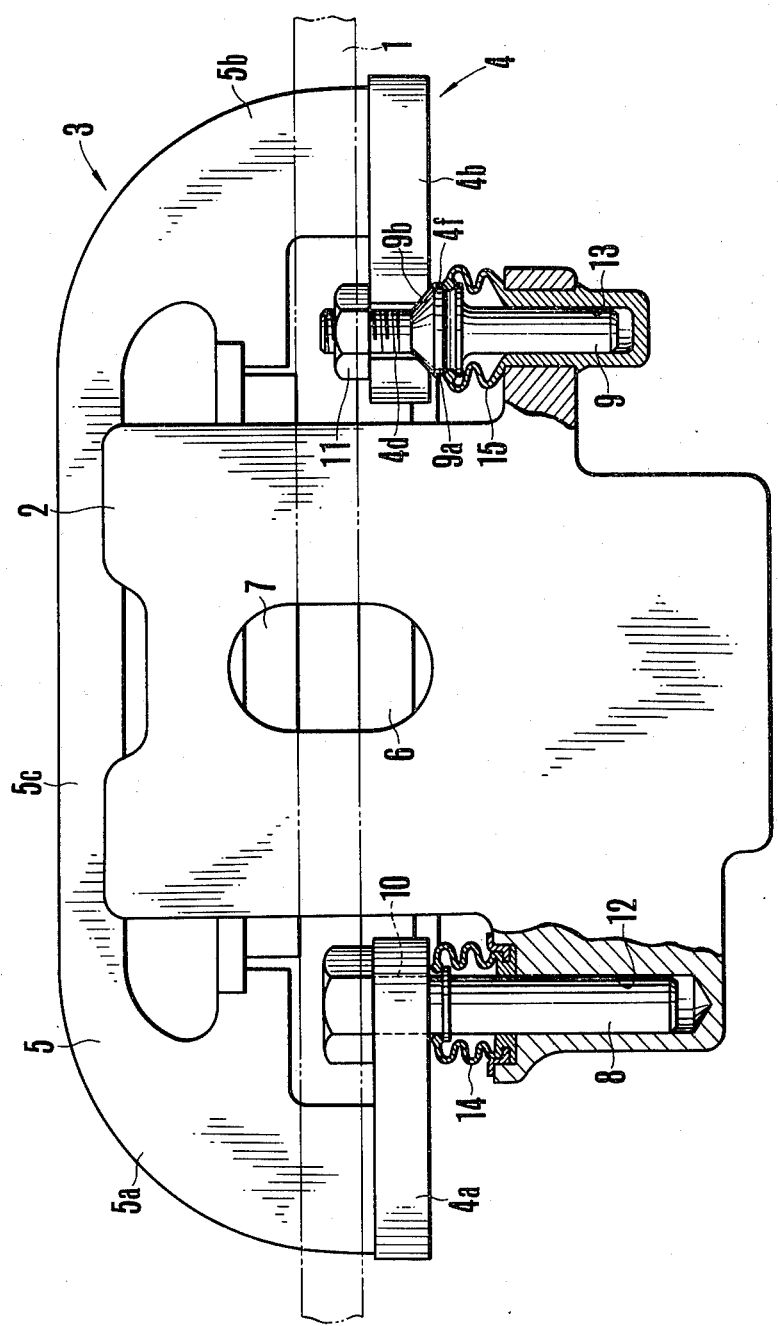
FIG. 5 is a side elevational view, partly in section, of a third embodiment of a disc brake according to the present invention.
Figure 6:
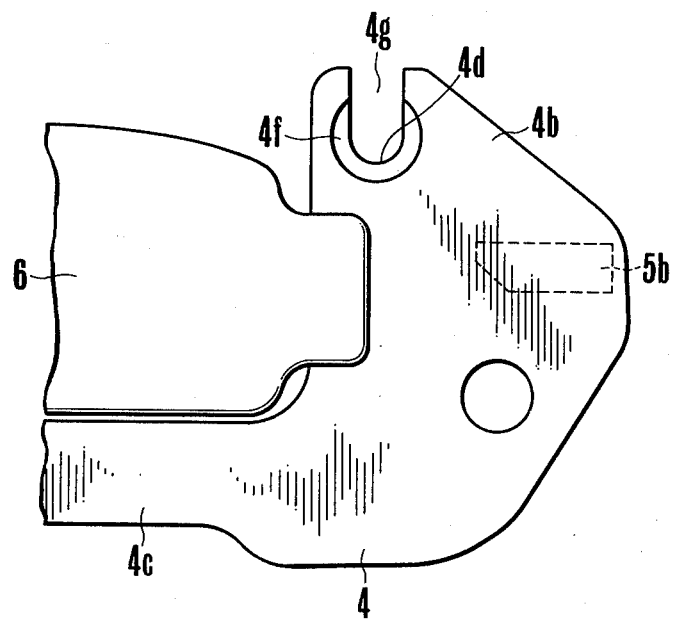
FIG. 6 is a fragmentary bottom view of the disc brake of FIG. 5 with the support plate having a laterally slotted-off hole provided with a bevelled portion.

FIGS. 5 and 6 show still another embodiment of the disc brake according to the present invention, wherein there is provided a device for automatically effecting the angular adjustment of the caliper 2 relative to the support member 3 when the second guide pin 9 is brought into rigidly secured relation to the first support plate 4, as the hole 4d is slotted off in a manner similar to that shown in connection with the FIGS. 1 and 2 embodiment of the invention. This device comprises first and second tapered annular surfaces arranged in mating relation to each other at a location where the angular adjustment of the caliper relative to the support plate 4 is established with high accuracy, the first tapered surface 4f is formed around the hole 4d on the lower surface of the first support plate 4, and the second tapered surface 9b is formed on the upper surface of a flanged portion 9a of the second guide pin 9. The provision of such a device has certain advantages, one of which is that the once established angular adjustment can be maintained as stabilized against introduction of accidental slippage which would be otherwise resulted because of these tapered surfaces 4f and 9b the position of the center of the pin 9 in respect to the first support plate 4 is automatically set. Further, the pin 9 never pulls out of the hole 4d, even when the nut 11 becomes loosened due to vibration caused by the running of the vehicle, as long as the two tapered faces 4f and 9b remain mechanically connected to each other.

Figure 7:
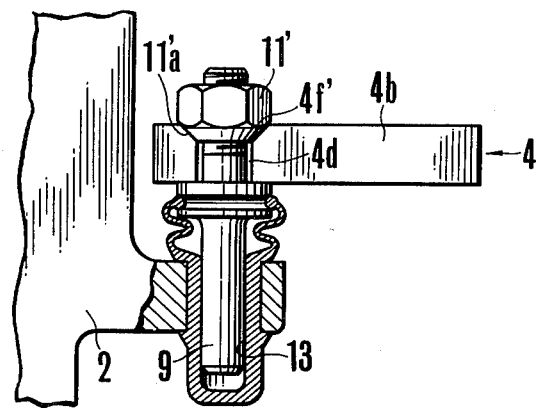
FIG. 7 is a fragmentary side elevational view, partly in section, of a fourth embodiment of a disc brake according to the present invention.

A modification may be made in the device as shown in FIG. 7, wherein the first tapered surface 4f' is provided on the upper surface of the first support plate 4, while the second tapered surface 11a' is provided on the lower surface of the nut 11'.

Further, an additional tapered surfaces arrangement may be provided between the first guide pin 8 and the first support plate 4.

As described and shown in the above, the present invention provides a disc brake of the floating caliper type having an improved caliper support structure with respect to reducing handling difficulties in assembling the parts of the complete brake and exchanging the old friction pads for new ones without suffering damage to the braking action, and thus improving the reliability of the braking function.

What is claimed is:

1. A disc brake of the floating caliper type for a vehicle wheel, comprising a rotor arranged to rotate together with the wheel, a pair of friction pads each positioned on an opposite side of said rotor, a support structure having a hole therein and supporting said pair of friction pads, said support structure having a slotted portion opening from and extending laterally from the hole formed therein, said support structure arranged to be fixably connected to a vehicle body, a caliper having acting and reacting portions arranged on opposite sides of said rotor for bringing said pair of friction pads into engagement with said disc, said caliper including first and second laterally spaced receptor holes formed therein, a first guide pin secured to said support structure and slidably received in said first receptor hole of said caliper, a single second guide pin, a nut threaded on said second guide pin and rigidly securing one end of said pin within said laterally slotted hole in said support structure and the other end of said pin engaged in the second receptor hole formed in said caliper, said first and second guide pins slidably guiding said caliper in the axial direction of said rotor, a sealing means secured between said second guide pin and said second receptor hole for sealingly enclosing said other end of said second guide pin, said caliper along with said second guide pin and said sealing means being pivotally rotated about said first guide pin with said second guide pin moving through said slotted portion outwardly from the hole in said support structure toward the lateral periphery of said support structure to expose said pair of friction pads for removal and replacement when the securement of said second guide pin to said support structure is released by loosening said nut.

2. A disc brake, as set forth in claim 1, wherein said slotted portion extends laterally from said hole in said support structure in substantially the radial direction of said rotor.

3. A disc brake, as set forth in claim 1, wherein said slotted portion extends laterally from said hole in said support structure in substantially the circumferential direction of said rotor.

4. A disc brake, as set forth in claim 3, wherein said sealing means comprises a sealing boot secured in the second receptor hole in said caliper, and a single annular projection formed on and extending inwardly from the inner surface of said sealing boot, said projection being disposed in slidable engagement with said second guide pin.

5. A disc brake, as set forth in claim 4, wherein said support structure comprises a first plate disposed in parallel with the axis of said rotor and a second plate disposed perpendicularly to said first plate, and said hole in said support structure being formed in said second plate.

6. A disc brake, as set forth in claim 1, wherein an area of said support structure around said hole and said second guide pin being provided with complementary tapered surfaces arranged in mating relation to one another so that when said nut is tightened an angular adjustment of said caliper relative to said support structure can be automatically effected.

7. A disc brake, as set forth in claim 1, wherein an area of said support around said hole and said nut being provided with complementary tapered surfaces arranged in mating relation to one another so that when said nut is tightened an angular adjustment of said caliper relative to said support structure can be automatically effected.

8. A disc brake, as set forth in claim 1, wherein said support structure comprises a first plate disposed in parallel with the axis of said rotor and a second plate disposed perpendicularly to said first plate, and said hole in said support structure being formed in said second plate.

* * * * *